United States Patent [19]

Zalewski

[11] Patent Number: 5,567,001

[45] Date of Patent: *Oct. 22, 1996

[54] AUTOMOTIVE VEHICLE SEAT FOR DISABLED PERSONS

[75] Inventor: Wojciech Zalewski, Belmont, Mass.

[73] Assignee: Enhancements Unlimited, Inc., Cambridge, Mass.

[*] Notice: The term of this patent shall not extend beyond the expiration date of Pat. No. 5,147,104.

[21] Appl. No.: 224,259

[22] Filed: Apr. 7, 1994

Related U.S. Application Data

[63] Continuation of Ser. No. 942,312, Sep. 9, 1992, Pat. No. 5,301,993, which is a continuation-in-part of Ser. No. 745,944, Aug. 16, 1991, Pat. No. 5,147,104, which is a continuation-in-part of Ser. No. 490,086, Mar. 7, 1990, Pat. No. 5,040,832.

[51] Int. Cl.$^6$ ............................................. B60M 1/10
[52] U.S. Cl. ............................. 296/65.1; 297/DIG. 10; 414/462
[58] Field of Search ................................. 296/65.1, 68.1; 414/462; 297/337, 338, 345, 346, DIG. 10

[56] References Cited

U.S. PATENT DOCUMENTS

| 4,155,587 | 5/1979 | Mitchell | 296/65.1 |
|---|---|---|---|
| 4,511,171 | 4/1985 | Petersen | 296/65.1 |
| 4,600,239 | 7/1986 | Gerstein et al. | 296/65.1 X |
| 4,802,706 | 2/1989 | Onimaru et al. | 296/65.1 X |
| 5,040,832 | 8/1991 | Zalewski | 296/65.1 |
| 5,147,104 | 9/1992 | Zalewski | 296/65.1 |
| 5,301,993 | 4/1994 | Zalewski | 296/65.1 |

FOREIGN PATENT DOCUMENTS

| 484593 | 7/1952 | Canada | 296/65.1 |
|---|---|---|---|

*Primary Examiner*—Joseph D. Pape
*Attorney, Agent, or Firm*—Morse, Altman & Benson

[57] ABSTRACT

An improved seat for a disabled driver or passenger of an automotive vehicle, is disclosed. The seat comprises a seat cushion including a stationary cushion component and a transport cushion component, the transport cushion component being constrained for movement in a path between a retracted position and an extended position. The transport cushion component is controlled by an operational system that includes a member having an extension member telescopically extendable from an end thereof and cable-drive means for moving the component between the retracted position and the extended position when under constant manual control. The manual actuator is accessible to constant manual control at the transport cushion and is recessed therein.

4 Claims, 8 Drawing Sheets

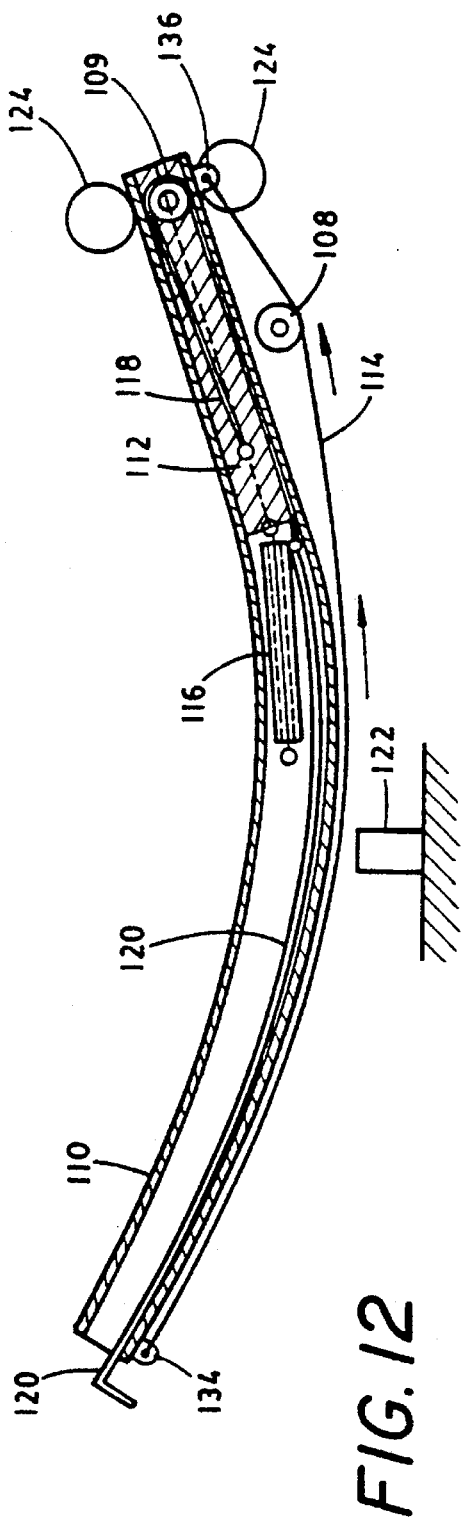
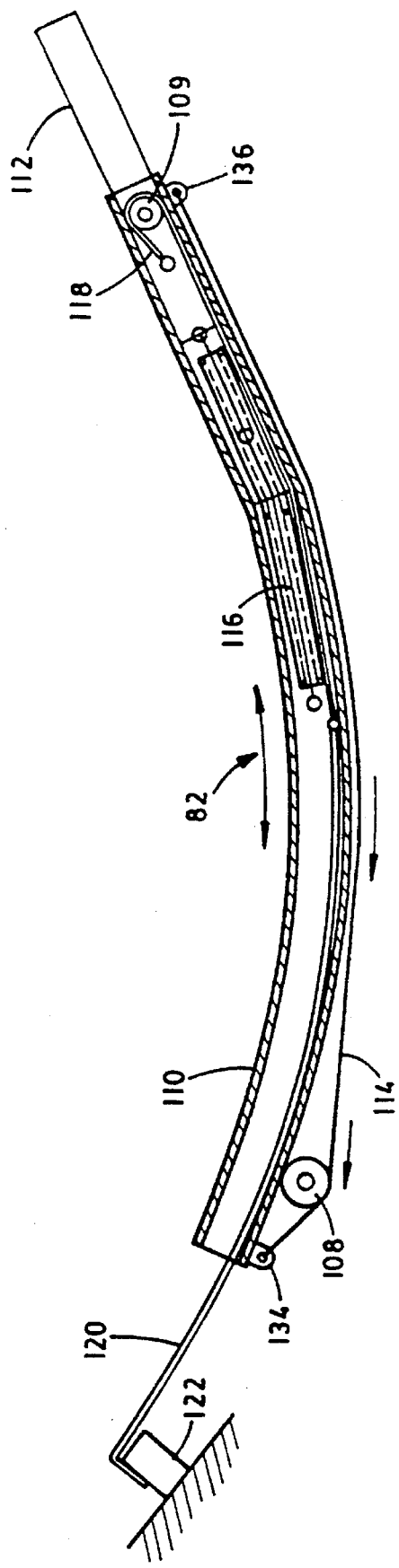

AUTOMOTIVE VEHICLE SEAT FOR DISABLED PERSONS

RELATED APPLICATIONS

The present application is a continuation of Ser. No. 07/942,312, filed on Sep. 9, 1992, now U.S. Pat. No. 5,301,993, which is a continuation-in-part of application Ser. No. 07/745,944, filed Aug. 16, 1991, now U.S. Pat. No. 5,147,104, which is a continuation-in-part of original application Ser. No. 07/490,086, filed Mar. 7, 1990, now U.S. Pat. No. 5,040,832.

BACKGROUND OF THE INVENTION

1. Field of the Invention

The present invention relates to automotive vehicle seats and, more particularly, to car, jeep, mini-van, and scooter seats of the type for assisting a disabled driver or passenger in accommodating himself or herself to and extricating himself or herself from an automotive vehicle front seat.

2. Background of the Invention

It is well known that many persons with anatomical problems resulting from arthritis, rheumatism, bodily injury, surgical trauma, back pain, sciatica, etc. experience difficulties when attempting to fit themselves into and extricate themselves from seating in an automobile or van. Spacial constraints include, inter alia, low headroom, projecting controls, steering wheel proximity, and door and window obstructions require bending and twisting contortions by the driver or passenger as he or she fits into or alights from the seat.

Confronted with such difficulties, a disabled person may be forced to limit or forego automotive travel. Prior constructions designed primarily to assist only paraplegics and other severely impaired drivers generally have been unwieldy and obtrusive in use, as well as unadapted for concommitant use by normal drivers and passengers. The present invention is a response to difficulties of the type confronting persons with limited or severe impairment.

SUMMARY OF THE INVENTION

The primary object of the present invention is to provide an automotive vehicle seat, primarily either a driver's or front passenger's seat, which accommodates all drivers normally, but which also optionally assists disabled drivers and passengers to fit themselves into and extricate themselves from a front seat of a car, jeep, scooter or van. For ease of explanation, a driver's bucket seat behind the steering wheel in a mini-van is illustrated in the drawing FIGS. 1–7 and described in the specification. A scooter is illustrated in FIGS. 8 and 9. It is to be understood, however, that a passenger's front seat also is contemplated and, in design, is essentially a mirror image of the driver's seat described in detail. The front seat of a mini-van, for example, often is higher than the front seat of a typical car and poses special difficulties for the persons with anatomical problems.

In normal mode, the seat of the present invention presents seat and back cushions of conventional appearance and comfort. A normal driver or passenger can sit down while facing outwardly through an open door and swing his or her legs and torso into a normal driving posture facing the windshield. From driving posture, a normal driver or passenger can swing his or her legs and torso around to permit reaching the ground through an open doorway.

In assist mode, the car seat cushion preferably divides into two parts, an outer movable transport or lift cushion that is adjacent to the side of the vehicle and an inner stationary cushion that is remote from the side of the vehicle. The transport cushion preferably operates electromechanically under the control of a disabled driver or passenger between an extended position and a retracted position. It provides a seat that gently controls the anatomy of the disabled driver or passenger between inner and outer postures at the side of the vehicle. When in retracted position, it permits the disabled driver or passenger to swing his or her legs and torso between forward and sideward orientations.

Preferably, the configuration of the seat cushion as a whole is contoured to present a seating configuration at the forward edge which tends to retain the torso of the driver in forward orientation. The side of the transport cushion at the side of the vehicle is rounded to enable the driver or passenger to glide into successive postures as it extends or retracts.

Other objects of the present invention will in part be obvious and will in part appear hereinafter.

BRIEF DESCRIPTION OF THE DRAWINGS

For a fuller understanding of the nature and objects of the present invention, reference is made to the accompanying drawings, wherein:

FIGS. 12 and 13 are elevational sections of a portion of the mechanism illustrated in FIGS. 10 and 11, also between a retracted and an extended position.

DETAILED DESCRIPTION OF THE PREFERRED EMBODIMENTS

The Embodiment of FIGS. 1–7

Figure 1:
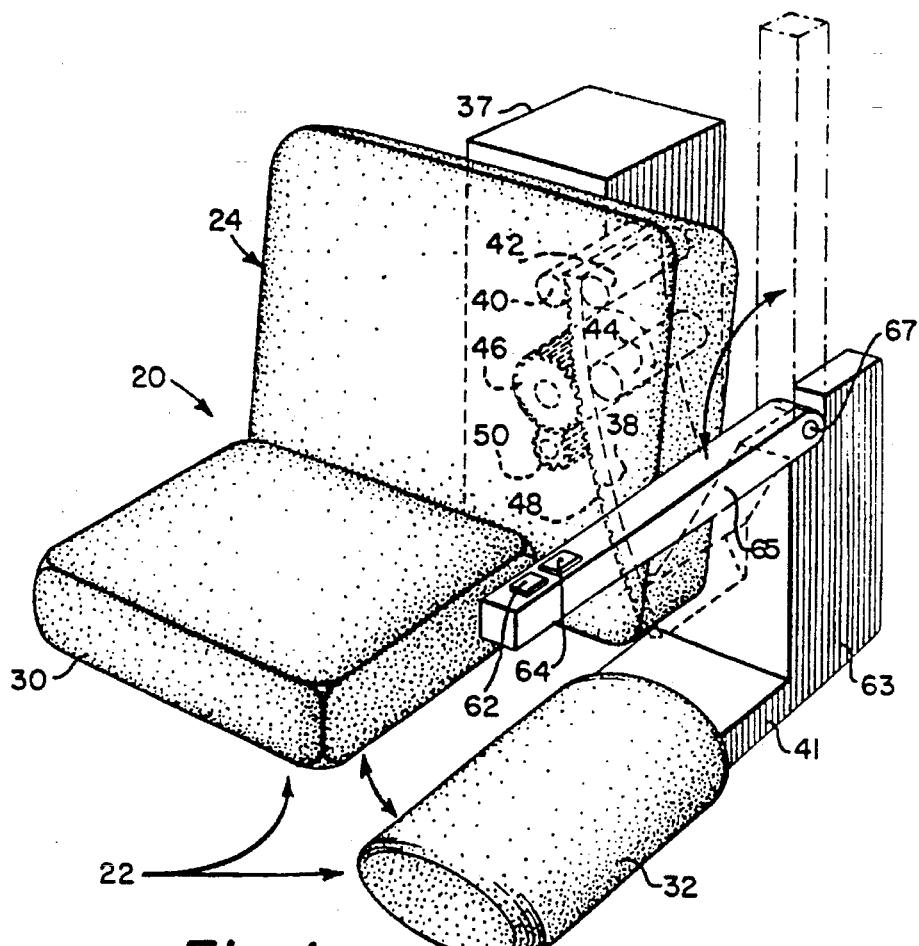
FIG. 1 is a perspective view, partly in phantom, to show the general structure of the car seat of the present invention.
Figure 3:
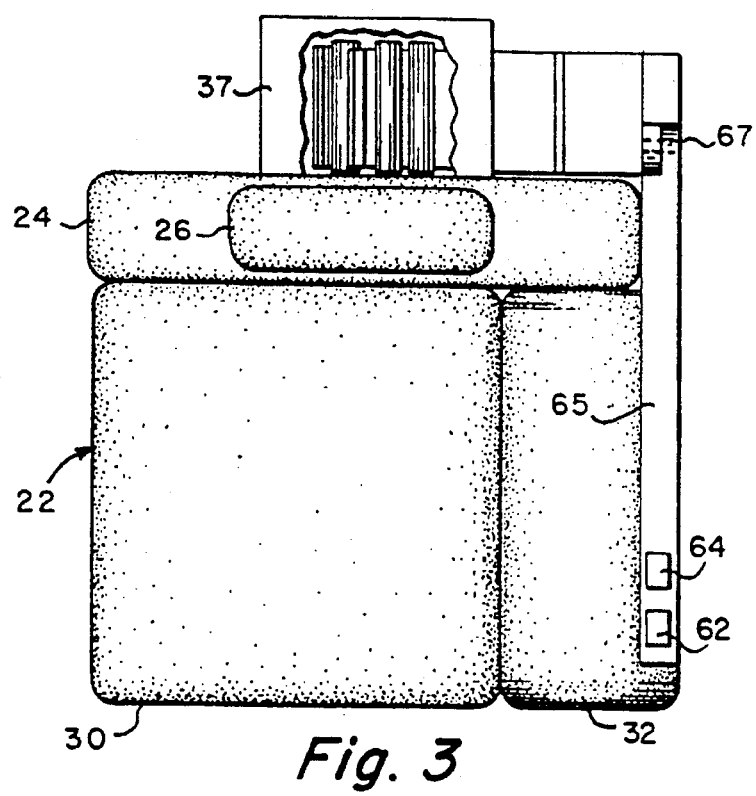
FIG. 3 is a top plan view of the car seat of FIG. 2, partly broken away.
Figure 2:
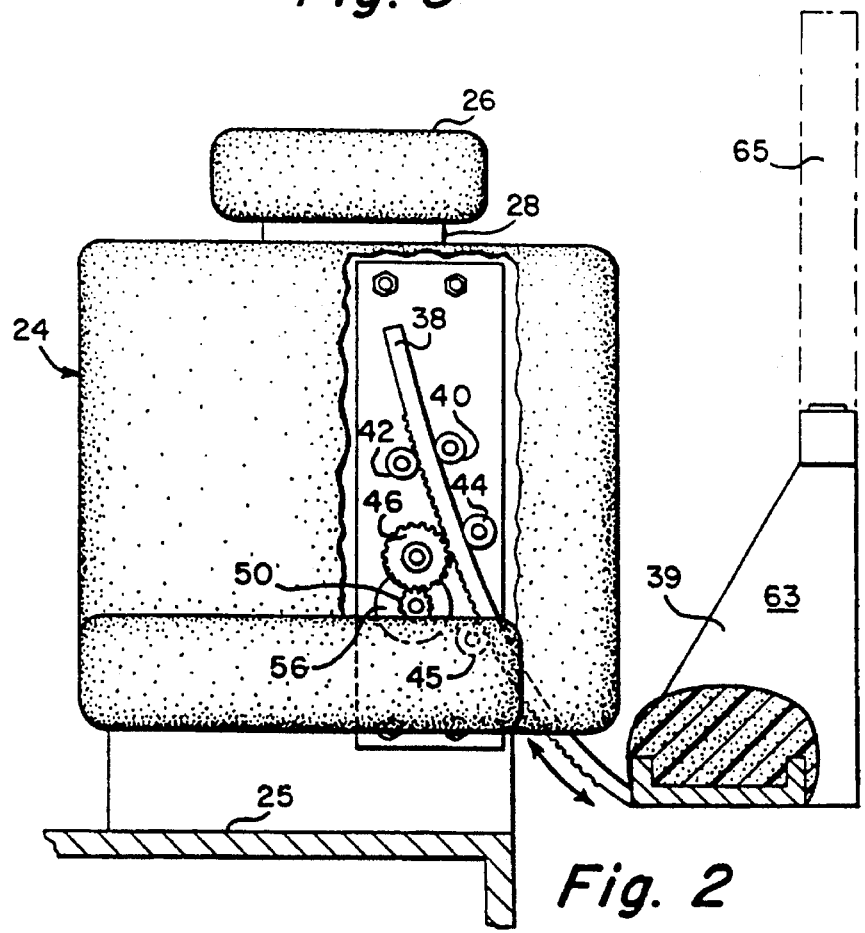
FIG. 2 is a front plan view of the car seat of FIG. 2, partly broken away.

The illustrated embodiment, as shown in FIGS. 1, 2 and 3, is a driver's seat 20 comprising a seat cushion assemblage 22, a back cushion 24 and a head cushion 26. Seat cushion assemblage 22 and back cushion 24 are carried by a frame, the base of which is shown at 25 and the back of which projects upwardly into back cushion 24. Back cushion 24 and head cushion 26 are of conventional appearance. Head cushion 26 is carried at the upper end of a mounting plate 28 which projects into a guide (not shown) at the top of the upright part of the frame within back cushion 24, by which its height is adjustable.

Figure 5:
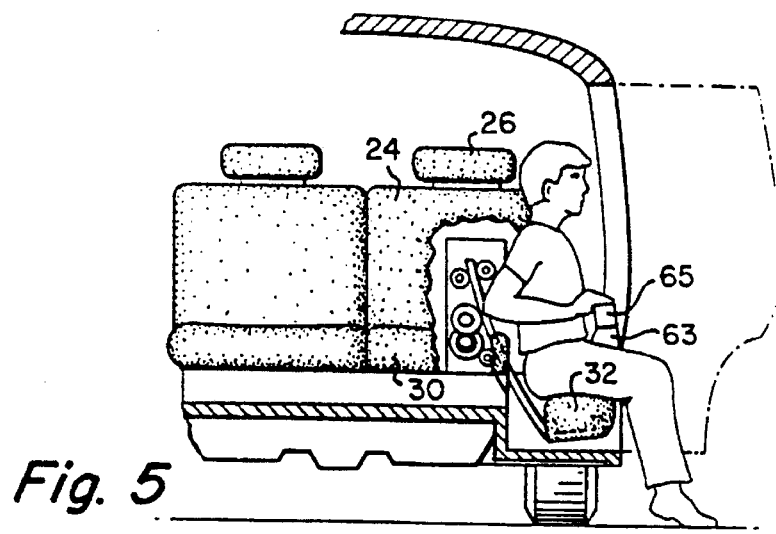
FIG. 5 illustrates the operation of the illustrated embodiment when in extended position.
Figure 6:
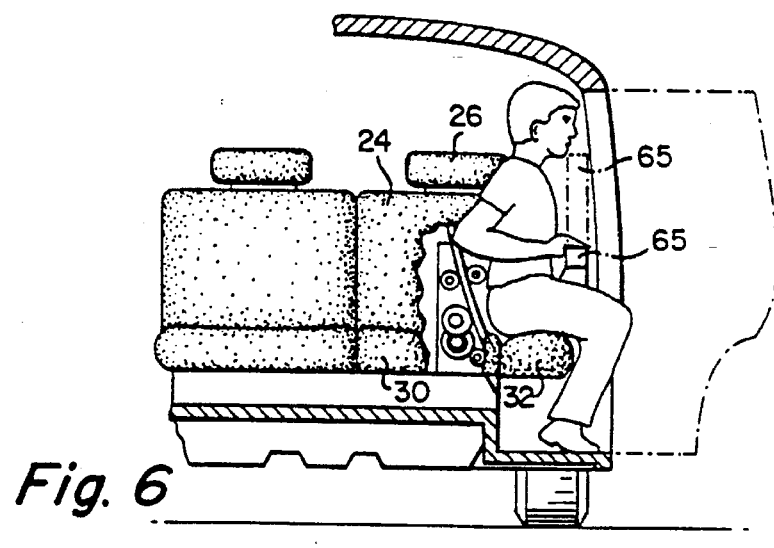
FIG. 6 illustrates the operation of the illustrated embodiment when in retracted position.
Figure 7:
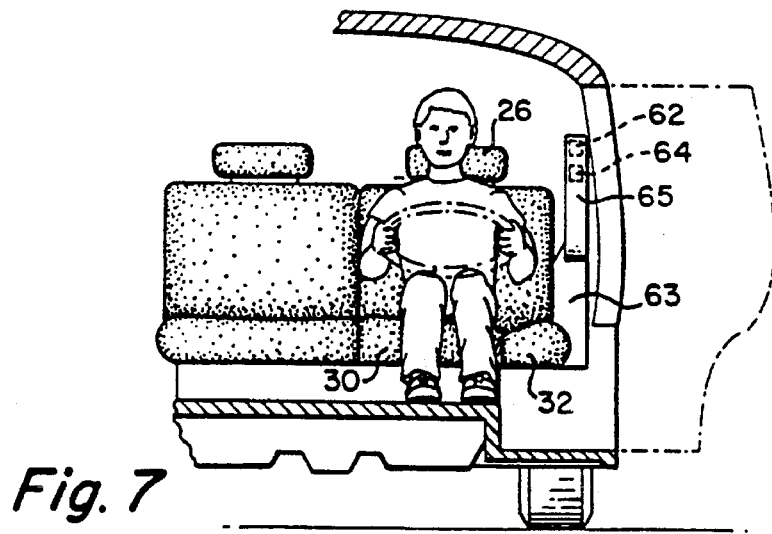
FIG. 7 further illustrates the operation of the illustrated embodiment when in use.

Seat cushion assemblage 22 includes a stationary cushion 30 and a transport or lift cushion 32. Transport cushion 32 is constrained for movement between a retracted position, as shown in FIGS. 3, 6 and 7, and an extended position, as shown in FIGS. 1, 2 and 5. Between these inner and outer extremities, the transport cushion 32 initially moves through a path that generally extends outwardly and downwardly. When transport cushion 32 is retracted, it presents, together with stationary cushion 30, a composite cushion assemblage with contours that comfortably seat both regular and disabled drivers. The profile across the front of the composite cushion assemblage, as seen in FIGS. 6 and 7, is a slight trough, the center of which is somewhat lower than the opposed sides of the stationary cushion and the transport cushion.

As shown in FIGS. 1, 2 and 3, the mechanism for carrying the transport cushion 32 between its retracted and extended positions is contained in a housing 37 at the rear of back cushion 24 and includes a curved slide 38 which is welded to a bracket 39 at its outer extremity. Housing 37 is mounted on frame 25. A horizontal arm 41 extends forwardly from bracket 39 for supporting the transport cushion 32. Movement of slide 38 is constrained by four rollers 40, 42, 44 and 45. The position of slide 38 in its path is determined, in this embodiment, by a drive pinion 46 which meshes with a rack 48 that is attached to and along the inner face of slide 38. Drive pinion 46 meshes with a control pinion 50 that is mounted on the shaft of a reversable motor 56 within housing 37. Rollers 40, 42, 44 and 45, motor 56 and gearing 46, 50 are mounted in housing 37. The path of slide 38 is established by rollers 40, 42 which oppose each other, and by rollers 44, 45 which oppose each other. Preferably, when viewed across the front of seat 20, the width of transport cushion 32 is no more than one-half the total width of the composite cushion so that it is free to clear the doorway.

Figure 4:
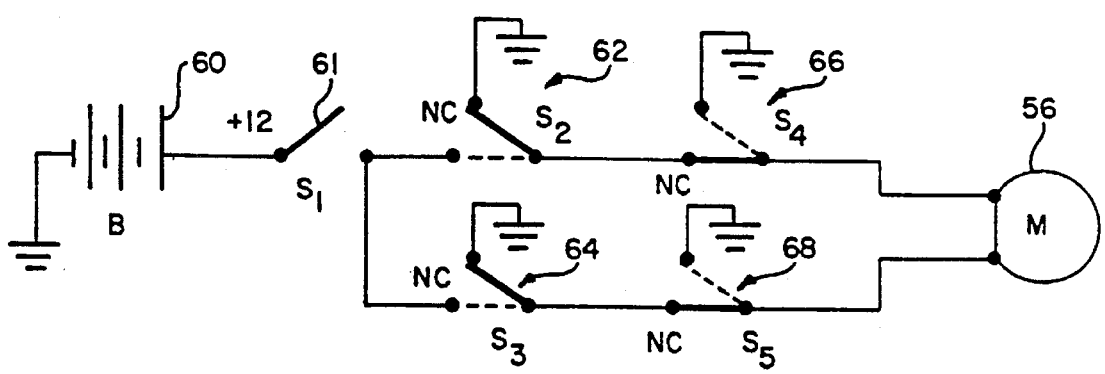
FIG. 4 illustrates the control circuit of the illustrated embodiment.

Motor 56 is powered by: the car battery 60; an "up" safety switch 62; a "down" safety switch 64; an interlock switch 61 which immobilizes the circuit when the door is closed; and a pair of limit switches 66, 68 which interrupt power when the transport cushion reaches its most extended or retracted position, note FIG. 4.

Upwardly extending from the bracket 39 is a vertical arm 63, which pivotally mounts a handle bar 65 on a hinge 67. Handle bar 65 moves between an upright orientation along the side of the seat and a transverse orientation along the length of the transport cushion. When handle bar 65 is upright, a person can move freely to and from the seat. When handle bar is across, a seated person is restrained on the transport cushion.

Switches 62, 64, which preferably are located on handle bar 65, must be controlled continuously by the driver in order to continually energize motor 56. Thus, any lapse in the driver's capacity or attention, as a safety precaution, will interrupt movement of the transport cushion. Switch 64 causes transport cushion 32 to extend. Switch 62 causes transport cushion 32 to retract. FIGS. 5, 6 and 7 depict the successive postures of the driver as he enters a mini-van through an open door.

As shown in FIG. 5, the driver is seated on the transport cushion 32 with his legs extending through the open door. His hands are resting on the handle bar 65, his right hand being in position to maintain contact with and control of the "up" switch 62 to cause the transport cushion to retract. As the transport cushion moves inwardly, the driver's grip on the handle bar 65 steadies his body as his posture changes. As the transport cushion 32 moves, the driver slides gradually and comfortably about its rounded outer edge. As shown in FIG. 6, retraction of the transport cushion 32 continues as the driver ascends through the open doorway. As shown in FIG. 7 the driver has swung his legs under the steering wheel and is in driving position.

When exiting the mini-van, the handle bar 65 is upright and the driver sits against the rounded edge of the extended transport cushion 32. Thereafter the driver pivots the handle bar 65 downwardly and maintains manual contact with and continued control of the "down" switch 62 as he proceeds through a sequence of steps that are opposite to the steps described above in reference to FIGS. 4, 5, and 6. The transport cushion mechanism prevents the door from closing unless the transport cushion 32 is entirely within the car and clear of the doorway. However, the car can be locked completely with the transport cushion 32 at least partly extended so as to be ready for a returning disabled driver. Alternatively, the car can be locked with the transport cushion 32 retracted so as to be ready for use by a normal driver or ready to be extended for use by a disabled driver.

OPERATION

In operation, the driver's or passenger's seat of the present invention is adapted for comfortable use by either a normal driver or passenger, or a disabled driver or passenger. When transport cushion 32 is retracted and handle bar 65 is upright, this automotive seat is characterized by the appearance and comfort of an ordinary mini-van seat. However, without any appreciable interference with such normal use, this car seat is adapted for use by a disabled driver or passenger who may steady himself behind the handle bar 65 at an open door as he or she presses the "up" or "down" switch for help in entering or leaving the mini-van.

The Embodiment of FIGS. 8–14

Figure 8:
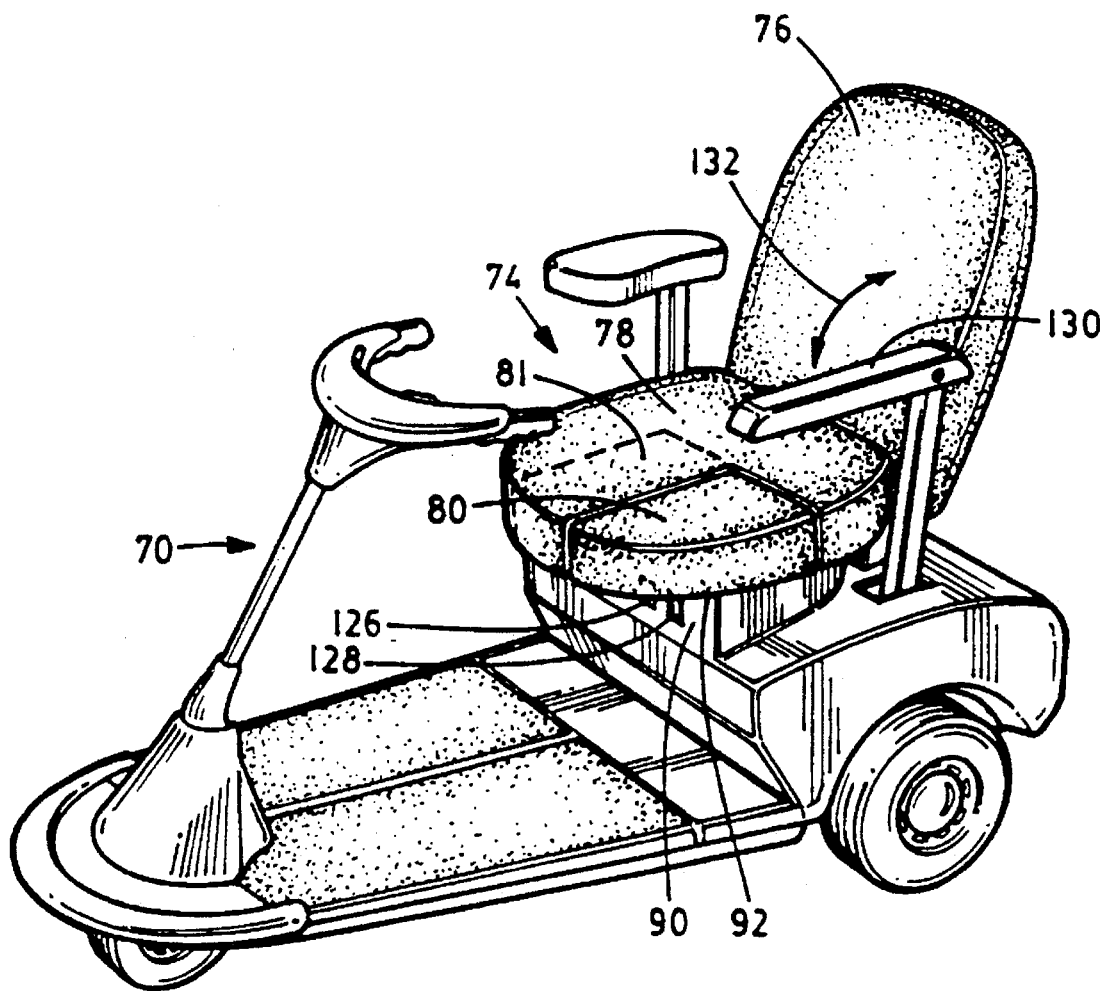
FIGS. 8 and 9 depict a scooter, a three-wheeler and a four-wheeler respectively, incorporating the present invention.
Figure 9:
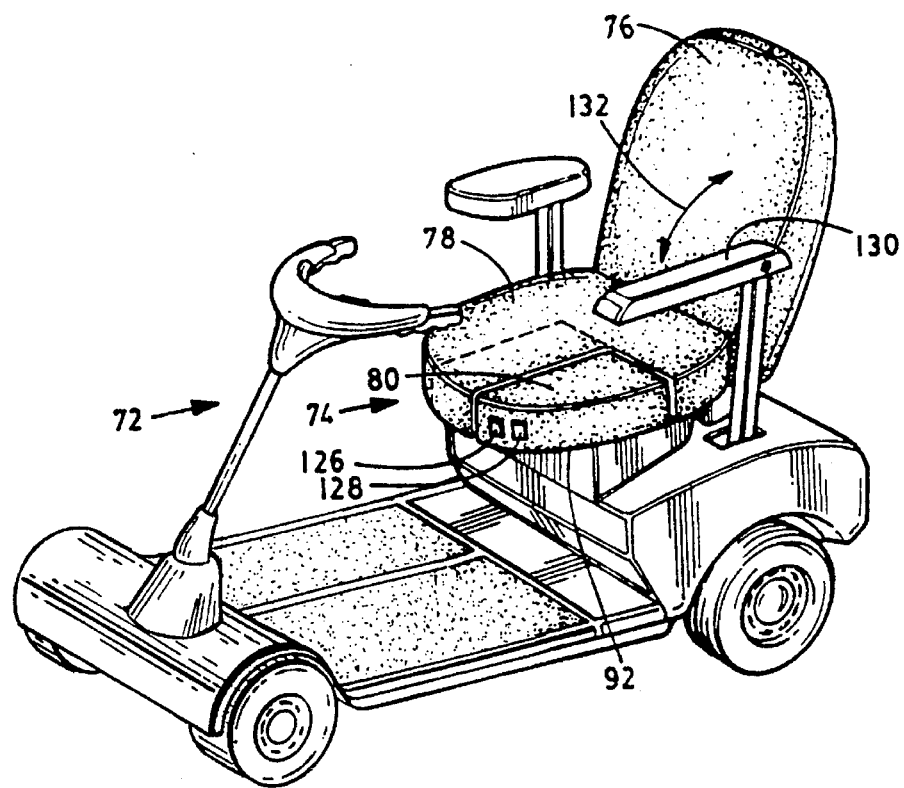

A three-wheeler scooter 70 and a four-wheeler scooter 72 are illustrated in FIGS. 8 and 9, incorporating the present invention. Each illustrates a seat cushion assemblage 74 and a back cushion 76. Seat cushion assemblage 74 includes a stationary cushion 78 and a transport or lift cushion 80. Lift cushion 80 can extend all the way back to the back cushion 76, similar to FIG. 1., or it can form but a part thereof, as illustrated in FIG. 8. Additionally, the lift cushion also can form more than half of the width of the seat cushion, as illustrated in dashed lines 81, also in FIG. 8.

Figure 10:
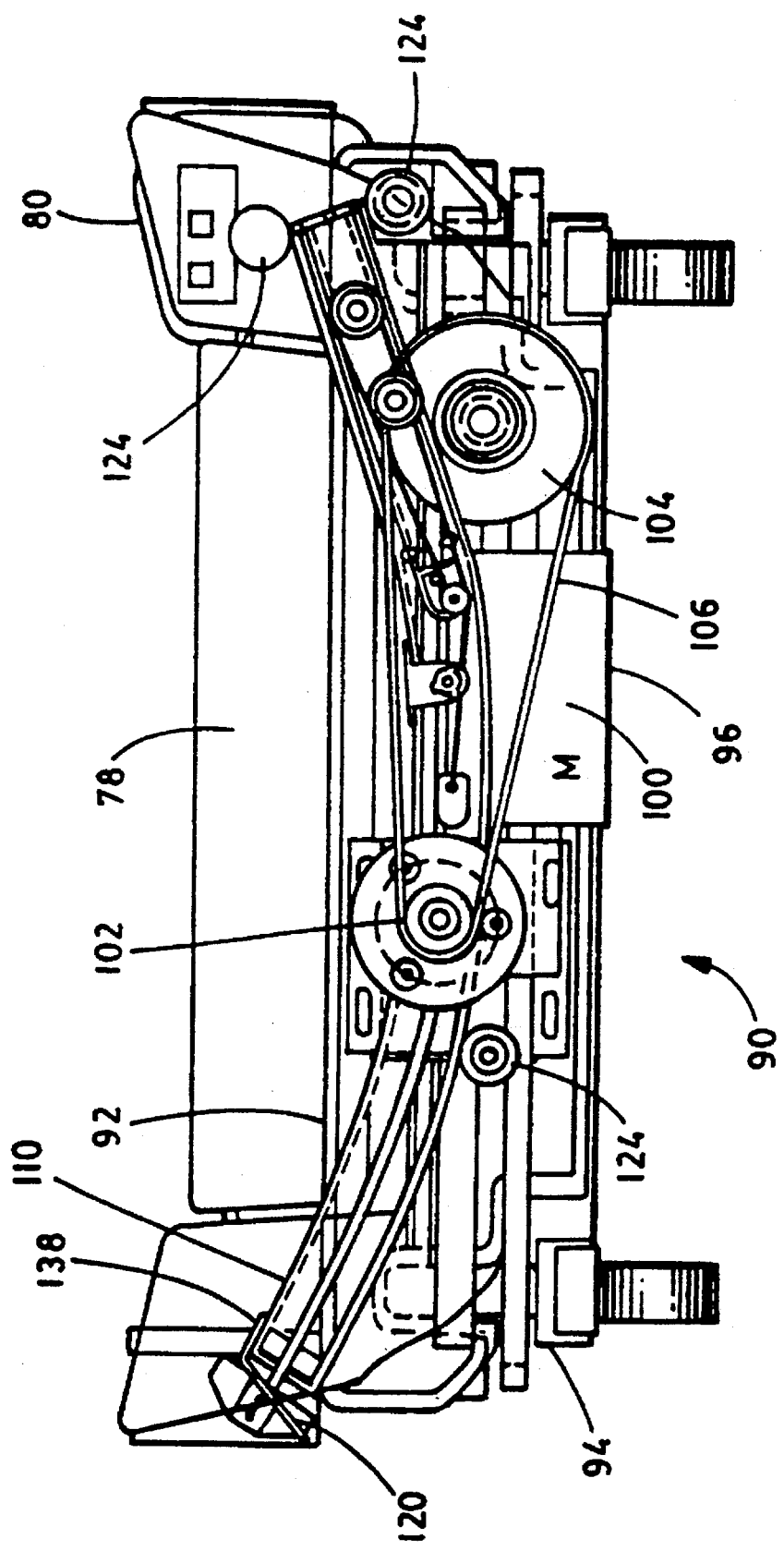
FIGS. 10 and 11 are front elevational views partly in section, of a mechanism adapted to operate the outer movable transport or lift cushion between a retracted and an extended position.
Figure 11:
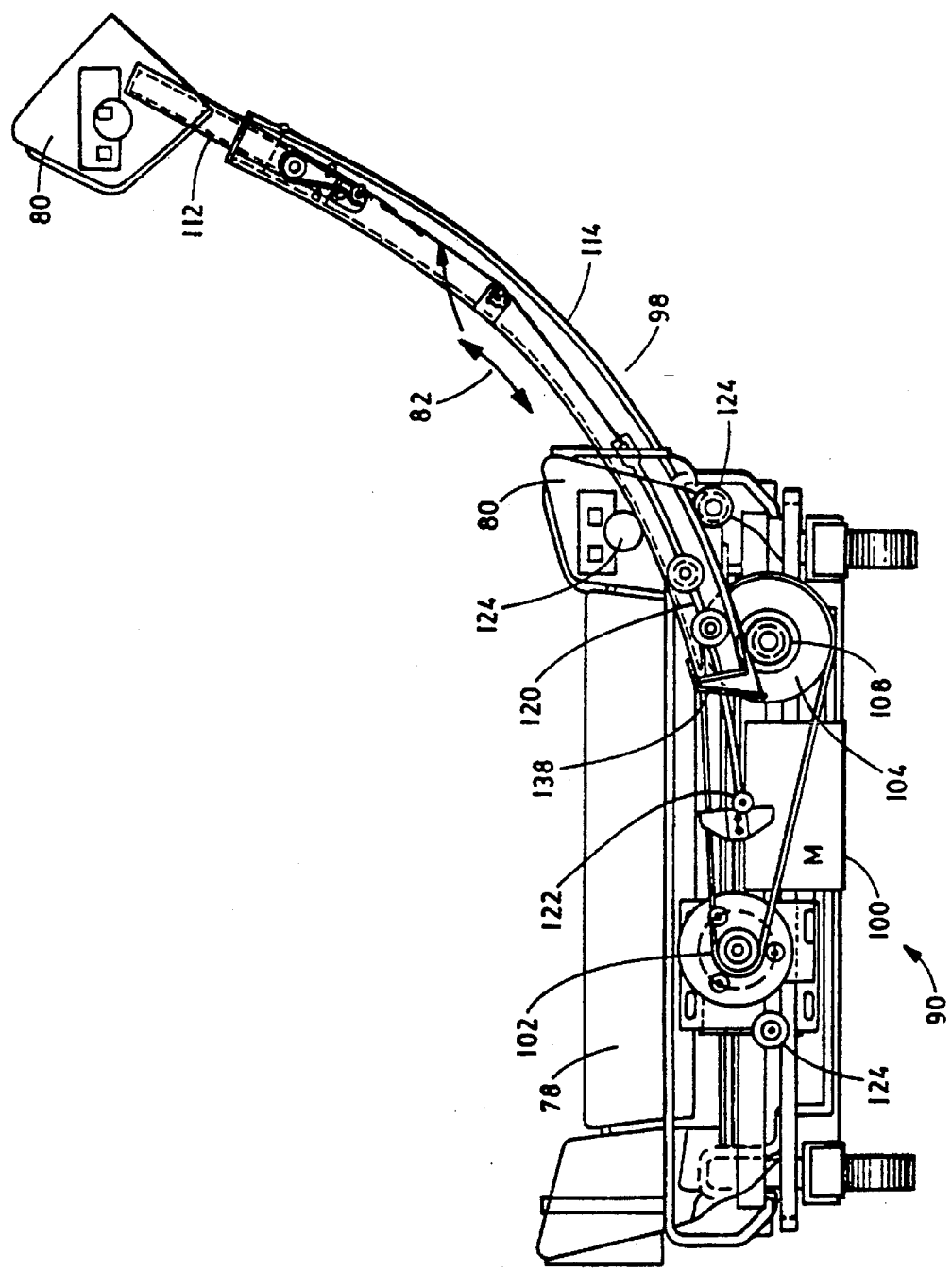

Transport or lift cushion 80 is constrained for movement between a retracted position, as shown in FIGS. 8, 9, 10 and 12, and an extended position, as shown in FIGS. 11 and 13. Between these inner and outer extremities, the transport cushion 80 initially moves through an arcuate path 82 that generally extends outwardly and either upwardly, as in U.S. Pat. No. 5,040,832 and illustrated here in FIGS. 10–13, or downwardly, as in co-pending application Ser. No. 07/745, 944, now U.S. Pat. No. 5,147,104, and illustrated here in FIGS. 1–7.

In lieu of the rack and pinion driving mechanism previously illustrated however, a novel cable-drive mechanism 90 is herein disclosed for carrying the transport cushion 80 between its retracted and extended positions. The cable-drive mechanism 90 can either be accommodated within a base support frame 92 disposed below the seat cushion assemblage 74, as shown in FIGS. 8 and 9, or it can be contained in the housing 37 at the rear of the back cushion, as illustrated in FIGS. 1–3.

The base support frame 92 preferably is mounted to a seat frame 94, observe FIG. 10. Cable-drive mechanism 90 essentially comprises electromechanical means 96 and operational means 98 coupled thereto. Electromechanical means 96 essentially includes an electric motor (M) 100, a small pulley 102 whose shaft is operable thereby, a large pulley 104 connected to the small pulley 102 with a drive belt 106, and a drum roller 108 driven by the large pulley 104, observe also FIG. 14. The electric motor (M) 100 is connected to the automotive battery 60 via the same circuit shown in and described with reference to FIG. 4.

The operational means 98 coupled to the electromechanical means 96 essentially includes a tubular member 110 telescopically carrying an extension member 112, a cable drive 114 operatively connecting the drum roller 108 to the tubular member 110, and means operatively connecting the extension member 112 to the tubular member 110. This last means includes spring means 116 anchored within the tubular member 110 and connected at its free end to the extension member 112, and an extension cable 118 connected at one end to the extension member 112 and at its other end to a pull rod 120 and wound about a pulley 109. The free end of the pull rod 120 extends from the tubular member 110 and becomes operable by a stop 122. The extension member 112 in turn, carries the transport or lift cushion 80, as shown in FIGS. 10 and 11. A plurality of rollers 124, together with the drum roller 108, serve as guide means for constraining the tubular member 110 along its arcuate path 82. The tubular member 110 is itself arcuately shaped for cantilever motion in its arcuate path 82.

The operational means 98 further includes manual actuating means comprising "up" and "down" safety switches 126 and 128, respectively. Preferably, safety switches 126 and 128 are recessed in the front part of the transport cushion 80 for easy and constant access to the person using the same. A handle bar 130 is hingedly mounted to the frame supporting the back cushion. Handle bar 130 preferably moves between an upright orientation and a transverse orientation, as indicate, by an arrow 132. Handle bar 130 also can move sideways in a horizontal plane. When handle bar 130 is upright, a person can move freely to and from the seat 74. Safety switch 126 causes transport cushion 80 to extend. Safety switch 128 causes transport cushion 80 to retract. A pair of limit switches 66 and 68 (FIG. 4) interrupt power when the cushion 80 reaches its most extended or retracted position. One of switches 126 or 128 must be continuously controlled by the person, for otherwise motor 100 becomes de-energized. Thus, any lapse in the person's capacity or attention, as a safety precaution, will interrupt movement of the transport cushion 80.

Operation of the Cable-Drive

Cable-drive mechanism 90 is operated as follows. With transport cushion 80 disposed adjacent the stationary cushion. 78, as illustrated in FIGS. 8 and 9, a person thereon seated first moves the handle-bar 130 into its upright position and then actuates the "up" safety switch 126. If desired, upward movement of the handle-bar 130 also can be actuated either by the same switch 126 or by a separate switch, not shown, powered by the same motor 100.

Figure 14:
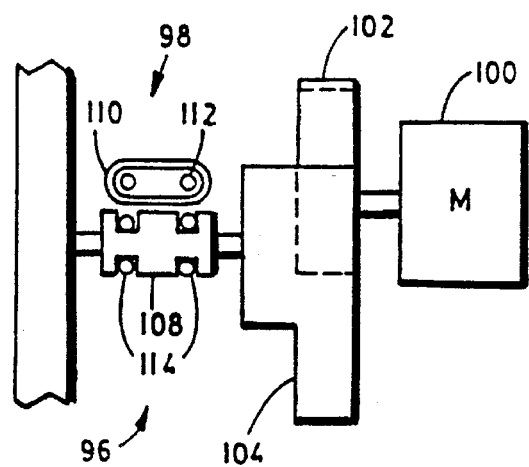
FIG. 14 is a schematic useful in understanding the operation of the mechanism illustrated in FIGS. 10 and 11.

When the switch 126 is actuated, the circuit shown in FIG. 4. is closed and power flows from the battery to the motor 100. Motor 100 commences to turn the small pulley 102 which then drives the large pulley 104 via the drive belt 106. The large pulley 104, through its shaft, drives the drum roller 108. Drum roller 108 has the cable-drive 114 wound once around thereon. Cable-drive 114 is anchored at its respective ends to the respective ends 134 and 136 of the tubular member 110. Preferably, and as illustrated in FIG. 14, the cable-drive 114 in designed to be disposed and ride within a slight depression formed in the surface of the drive roller 108. Also preferably, and as illustrated in FIG. 14, a pair of such cable-drives 114 are employed for added strength and safety in operation.

With tubular member 110 in its normal retracted position, as illustrated in FIGS. 10 and 12, a counter-clockwise rotation of the drum roller 108 will pull the cable-drive 114 and thereby the tubular member 110 to the right (as shown in the drawings) toward its extended position, carrying with it the transport cushion 80. With the tubular member 110 nearing its fully extended position, the pull rod 120 will come to rest against the stop 122. Further motion by the tubular member 110 will effect a relative displacement between member 110 and rod 120. Rod 120 in turn will cause the extension cable 118 to pull the extension member 112 progressively further out of the free end of the tubular member 110 until the cable-drive 114 has reached the end 134 of member 110. Preferably, a flat spring 138 (observe FIGS. 10 and 11) is secured about the end of member 110 and the cable-drive 114 is secured thereto. Flat spring 138 actuates one of the pair of limit switches 66, 68 (note FIG. 4.), which interrupt power when the transport cushion 80 reaches its most extended or retracted position.

The movement of the extension member 112 is against the residual force of spring means 116, when it is extended. It will be appreciated therefore that when retraction of the transport cushion 80 begins from its fully-extended position, spring means 116 will gradually retrieve the extension member 112 into the tubular member 110 as the latter is caused to move by the drum roller 108 acting on the cable-drive 114.

Thus it has been shown and described an improved automotive vehicle seat of the type for assisting a disabled person in accommodating himself to and extricating himself from an automotive vehicle seat, which product satisfies the objects and advantages set forth above.

Since certain changes may be made in the present disclosure without departing from the scope of the present invention, it is intended that all matter described in the accompanying drawings, be interpreted in an illustrative and not in a limiting sense.

What is claimed is:

1. A seat only for a single driver or single passenger of an automotive vehicle, said seat comprising:

(a) a back cushion presenting a geometrical contour only for said single driver or single passenger;

(b) a seat cushion presenting a geometrical contour only for said single driver or single passenger;

(c) electromechanical means;

(d) operational means coupled to said electromechanical means;

(e) said seat cushion including a primary stationary portion and an auxiliary transport portion;

(f) a driven component attached to said transport portion;

(g) said driven component being constrained for movement in a path between a retracted position and an extended position when actuated by said operational means;

(h) said operational means including manual actuating means for maintaining movement between said retracted position and said extended position when under constant manual control;

(i) said actuating means being accessible to constant manual control in close proximity to said transport portion; and (j) said transport portion being immovably affixed to said driven component.

2. The seat of claim 1 wherein said electromechanical means comprises an electric motor and circuitry for coupling said motor to a battery of said vehicle.

3. The seat of claim 2 wherein said electromechanical means further includes rotational drive means operatively connected to said motor.

4. The seat of claim 1 wherein said transport portion changes orientation solely by reason of movement of said driven component.

* * * * *